US012651559B2

(12) United States Patent
Pyo

(10) Patent No.: US 12,651,559 B2
(45) Date of Patent: Jun. 9, 2026

(54) DISPLAY DEVICE INCLUDING LOOKUP TABLE BASED VOLTAGE DRIVER AND METHOD OF OPERATING THE SAME

(71) Applicant: Samsung Display Co., LTD., Yongin-si (KR)

(72) Inventor: Si Beak Pyo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/054,812

(22) Filed: Feb. 15, 2025

(65) Prior Publication Data

US 2025/0391321 A1 Dec. 25, 2025

(30) Foreign Application Priority Data

Jun. 19, 2024 (KR) ........................ 10-2024-0079561
Sep. 6, 2024 (KR) ........................ 10-2024-0121525

(51) Int. Cl.
*G09G 3/32* (2016.01)

(52) U.S. Cl.
CPC ....... *G09G 3/32* (2013.01); *G09G 2300/0819* (2013.01); *G09G 2300/0861* (2013.01); *G09G 2320/0285* (2013.01); *G09G 2320/041* (2013.01); *G09G 2330/021* (2013.01); *G09G 2330/028* (2013.01); *G09G 2360/144* (2013.01)

(58) Field of Classification Search
CPC ............. G09G 3/32; G09G 2300/0819; G09G 2300/0861; G09G 2320/0285; G09G 2320/041; G09G 2330/021; G09G 2330/028; G09G 2360/144
See application file for complete search history.

(56) References Cited

U.S. PATENT DOCUMENTS

| | | | | |
|---|---|---|---|---|
| 11,417,262 | B2 * | 8/2022 | Kang | G09G 3/2092 |
| 12,387,657 | B2 * | 8/2025 | Shin | G09G 3/32 |
| 2018/0204526 | A1 * | 7/2018 | Heo | G06F 3/0488 |
| 2021/0110752 | A1 * | 4/2021 | Kim | G09G 3/2003 |
| 2021/0110772 | A1 * | 4/2021 | Seo | G09G 3/3258 |
| 2023/0119632 | A1 * | 4/2023 | Kwon | G09G 3/3233 345/690 |

* cited by examiner

*Primary Examiner* — Kwang-Su Yang
(74) *Attorney, Agent, or Firm* — CANTOR COLBURN LLP

(57) ABSTRACT

A display device includes: a display panel including a pixel, a voltage generator configured to generate a plurality of driving voltages for operating the pixel, and a driver configured to generate a data signal transmitted to the pixel, and to determine each of voltage levels of a second power voltage, a first initialization voltage, a second initialization voltage, and a first low voltage among the plurality of driving voltages based on a luminance level of an image displayed by the display panel, and the voltage generator is configured to generate the determined second power voltage, first initialization voltage, second initialization voltage, and first low voltage.

18 Claims, 8 Drawing Sheets

SV: $SV_{LUM}$, $SV_{TEMP}$
LUT: LUT1, LUT2, LUT3

SV: $SV_{LUM}$, $SV_{TEMP}$
LUT: LUT1, LUT2, LUT3, LUT4, LUT5

DISPLAY DEVICE INCLUDING LOOKUP TABLE BASED VOLTAGE DRIVER AND METHOD OF OPERATING THE SAME

This application claims priority to Korean Patent Application No. 10-2024-0079561 filed on Jun. 19, 2024, and Korean Patent Application No. 10-2024-0121525 filed on Sep. 6, 2024, and all the benefits accruing therefrom under 35 U.S.C. § 119, the content of which in their entirety are herein incorporated by reference.

BACKGROUND

1. Field

The disclosure relates to a display device and a method of operating the display device.

2. Description of the Related Art

As information technology develops, importance of a display device, which is a connection medium between a user and information, is emerging. In response to this, a use of the display device such as a liquid crystal display device and an organic light emitting display device is increasing.

SUMMARY

An aspect of the disclosure is to provide a display device and a method of operating the display device capable of reducing power consumption.

According to an embodiment of the disclosure, a display device includes: a display panel including a pixel, a voltage generator configured to generate a plurality of driving voltages for operating the pixel, and a driver configured to generate a data signal transmitted to the pixel, and to determine each of voltage levels of a second power voltage, a first initialization voltage, a second initialization voltage, and a first low voltage among the plurality of driving voltages based on a luminance level of an image displayed by the display panel, and the voltage generator is configured to generate the determined second power voltage, first initialization voltage, second initialization voltage, and first low voltage.

In an embodiment, the second power voltage may be supplied to a cathode electrode of a light emitting element included in the pixel, the first initialization voltage may be a voltage for initializing a gate electrode of a driving transistor included in the pixel, the second initialization voltage may be a voltage for initializing an anode electrode of the light emitting element, and the first low voltage may be a voltage for turning on a P-type transistor included in the pixel.

In an embodiment, the display device may further include a memory including a plurality of lookup tables. The driver may include a first voltage determiner configured to determine the voltage level of the second power voltage based on a first lookup table among the plurality of lookup tables, a second voltage determiner configured to determine the voltage level of the first initialization voltage based on a second lookup table among the plurality of lookup tables, and a third voltage determiner configured to determine the voltage level of the second initialization voltage based on a third lookup table among the plurality of lookup tables.

In an embodiment, the driver may further include a fourth voltage determiner configured to determine the voltage level of the first low voltage based on the voltage level of the second power voltage, the voltage level of the first initialization voltage, and the voltage level of the second initialization voltage.

In an embodiment, the fourth voltage determiner may determine the voltage level of the first low voltage based on following Formula 1:

$$VGL1 = \min(ELVSS, Vint1, Vint2) - \Delta V1. \quad \text{[Formula 1]}$$

In the Formula 1, VGL1 may be the first low voltage, ELVSS may be the second power voltage, Vint1 may be the first initialization voltage, Vint2 may be the second initialization voltage, and ΔV1 may be a predetermined positive number.

In an embodiment, ΔV1 of the Formula 1 may be a threshold voltage of the P-type transistor included in the pixel.

In an embodiment, the driver may further include a fifth voltage determiner configured to determine a voltage level of a second low voltage for turning off an N-type transistor included in the pixel among the plurality of driving voltages, based on the voltage level of the first low voltage.

In an embodiment, the fifth voltage determiner may determine the voltage level of the second low voltage based on following Formula 2:

$$VGL2 = VGL1 + \Delta V2. \quad \text{[Formula 2]}$$

In the Formula 2, VGL2 may be the second low voltage, and ΔV2 may be a predetermined positive number.

In an embodiment, the fifth voltage determiner may be configured to determine the ΔV2 of the Formula 2 based on the luminance level.

In an embodiment, the driver may further include a fourth voltage determiner configured to determine the voltage level of the first low voltage based on a fourth lookup table among the plurality of lookup tables, and a fifth voltage determiner configured to determine a voltage level of a second low voltage for turning off an N-type transistor included in the pixel among the plurality of driving voltages based on a fifth lookup table among the plurality of lookup tables.

In an embodiment, the display device may further include a temperature sensor configured to sense a temperature around the display panel. The driver may be configured to determine each of the voltage levels of the second power voltage, the first initialization voltage, the second initialization voltage, and the first low voltage based on a temperature sensing value generated by the temperature sensor and the luminance level of the image displayed by the display panel, and the voltage generator may be configured to generate the determined second power voltage, first initialization voltage, second initialization voltage, and first low voltage.

In an embodiment, the display device may further include an illuminance sensor configured to sense an illuminance around the display panel. The driver may determine luminance level based on an illuminance sensing value generated by the illuminance sensor and image data input to the display device.

According to another embodiment of the disclosure, a method of operating a display device includes: determining each of voltage levels of a second power voltage and an initialization voltage supplied to a pixel of the display device, based on a luminance level, determining a voltage level of a first low voltage applied to a gate of a first type transistor included in the pixel, based on the determined voltage levels of the second power voltage and the initialization voltage, and determining a voltage level of a second low voltage applied to a gate of a second type transistor included in the pixel, based on the voltage level of the first low voltage.

In an embodiment, the first type transistor may be a P-type transistor, the second type transistor may be an N-type transistor, the voltage level of the first low voltage may be a voltage level for turning on the P-type transistor, and the voltage level of the second low voltage may be a voltage level for turning off the N-type transistor.

In an embodiment, the initialization voltage may include a first initialization voltage for initializing a gate electrode of a driving transistor included in the pixel and a second initialization voltage for initializing an anode electrode of a light emitting element included in the pixel, the second power voltage may be supplied to a cathode electrode of the light emitting element included in the pixel. Determining the voltage level of the first low voltage may include determining the voltage level of the first low voltage based on following Formula 1:

$$VGL1 = \min(ELVSS, Vint1, Vint2) - \Delta V1. \quad \text{[Formula 1]}$$

In the Formula 1, VGL1 may be the first low voltage, ELVSS may be the second power voltage, Vint1 may be the first initialization voltage, Vint2 may be the second initialization voltage, and ΔV1 may be a predetermined positive number.

In an embodiment, determining the voltage level of the second low voltage may include determining the voltage level of the second low voltage based on following Formula 2:

$$VGL2 = VGL1 + \Delta V2. \quad \text{[Formula 2]}$$

In the Formula 2, VGL2 may be the second low voltage, and ΔV2 may be a predetermined positive number.

In an embodiment, determining each of the voltage levels of the second power voltage and the initialization voltage may include: determining the voltage level of the second power voltage based on a first lookup table, determining a voltage level of a first initialization voltage for initializing a gate electrode of a driving transistor included in the pixel among the initialization voltage based on a second lookup table, and determining a voltage level of a second initialization voltage for initializing an anode electrode of a light emitting element included in the pixel among the initialization voltage based on a third lookup table.

In an embodiment, the method may further include generating the second power voltage and the initialization voltage based on the determined voltage levels, and displaying an image on a display unit of the display device based on the generated second power voltage and initialization voltage.

According to still another embodiment of the disclosure, a method of operating a display device includes: determining each of voltage levels of a second power voltage, a first initialization voltage, and a second initialization voltage supplied to a pixel of the display device, based on first to third lookup tables, determining a voltage level of a first low voltage applied to a gate of a first type transistor included in the pixel, based on a fourth lookup table, and determining a voltage level of a second low voltage applied to a gate of a second type transistor included in the pixel, based on a fifth lookup table.

In an embodiment, the first initialization voltage may be a voltage for initializing a gate electrode of a driving transistor included in the pixel, the second initialization voltage may be a voltage for initializing an anode electrode of a light emitting element included in the pixel, the second power voltage may be supplied to a cathode electrode of the light emitting element included in the pixel, the first type transistor may be a P-type transistor, the second type transistor may be an N-type transistor, the voltage level of the first low voltage may be a voltage level for turning on the P-type transistor, and the voltage level of the second low voltage may be a voltage level for turning off the N-type transistor.

According to an embodiment of the disclosure, an electronic device includes: a display panel including a pixel, a voltage generator configured to generate a plurality of driving voltages for operating the pixel, and a driver configured to generate a data signal transmitted to the pixel, and to determine each of voltage levels of a second power voltage, a first initialization voltage, a second initialization voltage, and a first low voltage among the plurality of driving voltages based on a luminance level of an image displayed by the display panel, and the voltage generator is configured to generate the determined second power voltage, first initialization voltage, second initialization voltage, and first low voltage.

Aspects of the disclosure are not limited to the aspect described above, and other technical aspects which are not described may be clearly understood by those skilled in the art from the following description.

In accordance with a display device and a method of operating the display device according to embodiments of the disclosure, power consumption may be reduced.

However, an effect of the disclosure is not limited to the effect described above, and may be variously expanded within the scope that does not depart from the spirit and area of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
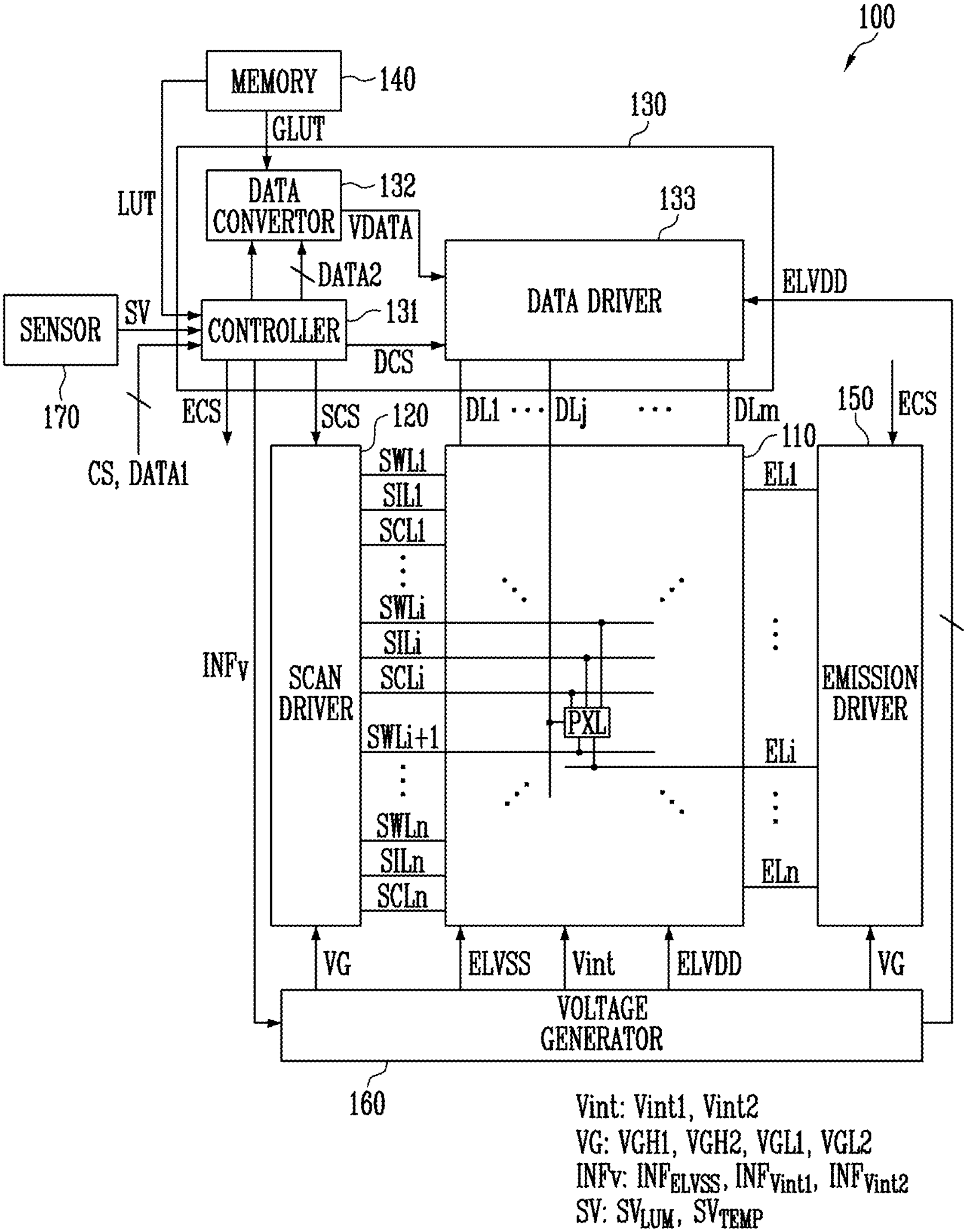
FIG. 1 is a block diagram illustrating a display device according to an embodiment of the disclosure.

The disclosure may be modified in various manners and have various forms. Therefore, specific embodiments will be illustrated in the drawings and will be described in detail in the specification. However, it should be understood that the disclosure is not intended to be limited to the disclosed specific forms, and the disclosure includes all modifications, equivalents, and substitutions within the spirit and technical scope of the disclosure.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. In the following description, the singular expressions include plural expressions unless the context clearly dictates otherwise.

It should be understood that in the present application, a term of "include", "have", or the like is used to specify that there is a feature, a number, a step, an operation, a component, a part, or a combination thereof described in the specification, but does not exclude a possibility of the presence or addition of one or more other features, numbers, steps, operations, components, parts, or combinations thereof in advance.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

Hereinafter, a display device according to an embodiment of the disclosure is described with reference to drawings related to embodiments of the disclosure.

FIG. 1 is a block diagram illustrating a display device according to an embodiment of the disclosure.

Referring to FIG. 1, the display device 100 may include a display unit 110 (or a display panel), a scan driver 120, a driver 130, a memory 140 (or a storage unit), an emission driver 150, a voltage generator 160, and a sensor 170.

The display unit 110 may include scan lines SIL1 to SILn, SCL1 to SCLn, and SWL1 to SWLn, data lines DL1 to DLm (where m is a positive integer), emission control lines EL1 to ELn, and a pixel PXL. The pixel PXL may be disposed in an area partitioned by the scan lines SIL1 to SILn, SCL1 to SCLn, and SWL1 to SWLn, the data lines DL1 to DLm, and the emission control lines EL1 to ELn.

The pixel PXL may be connected to at least one of the scan lines SIL1 to SILn, one of the scan lines SCL1 to SCLn, one of the scan lines SWL1 to SWLn, one of the data lines DL1 to DLm, and one of the emission control lines EL1 to ELn. For example, the pixel PXL positioned in an i-th row and a j-th column may be connected to i-th scan lines SILi, SCLi, SWLi, and SWLi+1, a j-th data line DLj, and an i-th emission control line ELi (where, each of i and j is a positive integer).

The pixel PXL may store or record a data signal (or a data voltage) provided through the j-th data line DLj in response to a scan signal provided through the i-th scan line SWLi, and may emit light with a luminance corresponding to the stored data signal in response to an emission control signal provided through the i-th emission control line ELi. The pixel PXL is described later with reference to FIG. 2.

The scan driver 120 may generate the scan signal based on a scan control signal SCS and sequentially provide the scan signal to the scan lines SIL1 to SILn, SCL1 to SCLn, and SWL1 to SWLn. Here, the scan control signal SCS may include a start signal, clock signals, and the like, and may be provided from the driver 130. For example, the scan driver 120 may include a shift register that sequentially outputs the scan signal corresponding to the start signal of a pulse form using the clock signals.

The scan driver 120 may be formed in the display unit 110 through the same process as a process of forming the pixel PXL, or may be implemented as a separate integrated circuit.

The emission driver 150 may generate the emission control signal based on an emission control signal ECS and provide the emission control signal to the emission control lines EL1 to ELn sequentially or simultaneously. Here, the emission drive control signal ECS may include an emission start signal, emission clock signals, and the like, and may be provided from the driver 130. For example, the emission driver 150 may include a shift register that sequentially outputs the emission control signal corresponding to the emission start signal of a pulse form using the emission clock signals.

The driver 130 may generate data signals based on input image data DATA1 and a control signal CS provided from an outside (for example, a graphics processor).

The driver 130 may include a controller 131 (or a timing controller), a data converter 132, and a data driver 133. The controller 131, the data converter 132, and the data driver 133 may be implemented in one integrated circuit. However, this is an example and is not limited thereto. For example, the controller 131 may be implemented as an integrated circuit by including the data converter 132, and the data driver 133 may be implemented as an integrated circuit independent from the controller 131.

The controller 131 may receive the input image data DATA1 and the control signal CS from the outside, generate the scan control signal SCS and the data control signal DCS based on the control signal CS, and generate an image data DATA2 by converting the input image data DATA1. Here, the control signal CS may include a vertical synchronization signal, a horizontal synchronization signal, a clock, and the like. For example, the controller 131 may convert the input image data DATA1 of a red-green-blue (RGB) format into the image data DATA2 of a red-green-blue-green (RGBG) format that matches a pixel arrangement in the display unit 110. However, the disclosure is not limited thereto. In another embodiment, the format of the image data DATA2 may be different from the RGBG format.

The data converter 132 may convert an input grayscale value included in the image data DATA2 into a voltage value VDATA using a gamma lookup table GLUT. Here, the gamma lookup table GLUT may include the voltage value VDATA corresponding to the input grayscale value. In an embodiment, the gamma lookup table GLUT may be provided from the memory 140 to the data converter 132.

The data driver 133 may generate data signals based on the data control signal DCS provided from the controller 131 and the voltage value VDATA provided from the data converter 132, and provide the data signals to the display unit 110 (or the pixel PXL). Here, the data control signal DCS may be a signal that controls an operation of the data driver 133, and may include a load signal (or a data enable signal) that directs an output of a valid data signal.

For example, the data driver 133 may include a shift register, a latch, a decoder, an output buffer, and the like, and the data driver 133 may sequentially provide or temporarily store the voltage value VDATA in the shift register or the latch based on the data control signal DCS and output the data signal corresponding to the voltage value VDATA to the data line through the decoder.

The memory 140 may store the gamma lookup table GLUT. In an embodiment, the memory 140 may store a lookup table LUT for setting a driving voltage. The lookup table LUT may be transmitted to the controller 131.

For example, the memory 140 may be implemented as a flash memory, may be mounted on a flexible circuit board on which the driver 130 is mounted, and may be connected to the driver 130 (for example, the data converter 132).

The voltage generator 160 may supply first and second power voltages ELVDD and ELVSS to the display unit 110. Here, the first and second power voltages ELVDD and ELVSS may be voltages for an operation of the pixel PXL, and the first power voltage ELVDD may have a voltage level higher than a voltage level of the second power voltage ELVSS. In addition, an initialization power voltage Vint may be provided to the display unit 110 by the voltage generator 160. In another embodiment, the initialization power voltage Vint may be provided to the display unit 110 from the voltage generator 160 through the driver 130 (for example, the data driver 133). In an example, the initialization power voltage Vint may include a first initialization power voltage Vint1 and a second initialization power voltage Vint2.

In addition, the voltage generator 160 may supply a gate voltage VG to the scan driver 120 and the emission driver 150. The gate voltage VG may be a voltage input to a gate of transistors included in the pixel PXL in the display unit 110. For example, the gate voltage VG may include a first high voltage VGH1, a first low voltage VGL1, a second high voltage VGH2, and a second low voltage VGL2. The first high voltage VGH1 may be a voltage for turning off a P-type transistor included in the pixel PXL. The first low voltage VGL1 may be a voltage for turning on the P-type transistor included in the pixel PXL. The second high voltage VGH2 may be a voltage for turning on an N-type transistor included in the pixel PXL. The second low voltage VGL2 may be a voltage for turning off the N-type transistor included in the pixel PXL.

Additionally, the voltage generator 160 may supply a first power voltage ELVDD to the data driver 133.

The sensor 170 may generate a sensing value SV related to the display device 100 and transmit the generated sensing value SV to the controller 131 of the driver 130. In an embodiment, the sensor 170 may include an illuminance sensor that senses an illuminance around the display device 100 and generates an illuminance sensing value $SV_{LUM}$ corresponding to an illuminance sensing result. In another embodiment, the sensor 170 may include a temperature sensor that senses a temperature around the display device 100 and generates a temperature sensing value $SV_{TEMP}$ corresponding to a temperature sensing result.

In accordance with the display device 100 according to an embodiment of the disclosure, the driver 130 may receive the sensing value SV from the sensor 170 and control an operation of the voltage generator 160 based on the received sensing value SV. Specifically, the controller 131 of the driver 130 may generate voltage information INFv by referring to the lookup table LUT received from the memory 140 and send the voltage information INFv to the voltage generator 160. The voltage information INFv may be a value for changing at least one value among the voltages generated by the voltage generator 160. The voltage generator 160 may change at least one value among the generated voltages, based on the received voltage information INFv.

For example, the controller 131 may determine a voltage level of a second power voltage ELVSS by referring to the lookup table LUT and generate voltage information $INF_{ELVSS}$ corresponding thereto. In addition, the controller 131 may determine a voltage level of the first initialization voltage Vint1 by referring to the lookup table LUT and generate voltage information $INF_{Vint1}$ corresponding thereto. In an embodiment, the controller 131 may determine a voltage level of the second initialization voltage Vint2 by referring to the lookup table LUT and generate voltage information $INF_{Vint2}$ corresponding thereto.

The voltage generator 160 may change the voltage levels of the second power voltage ELVSS, the first initialization voltage Vint1, and the second initialization voltage Vint2, based on the received voltage information $INF_{ELVSS}$, $INF_{Vint1}$, and $INF_{Vint2}$.

Figure 2:
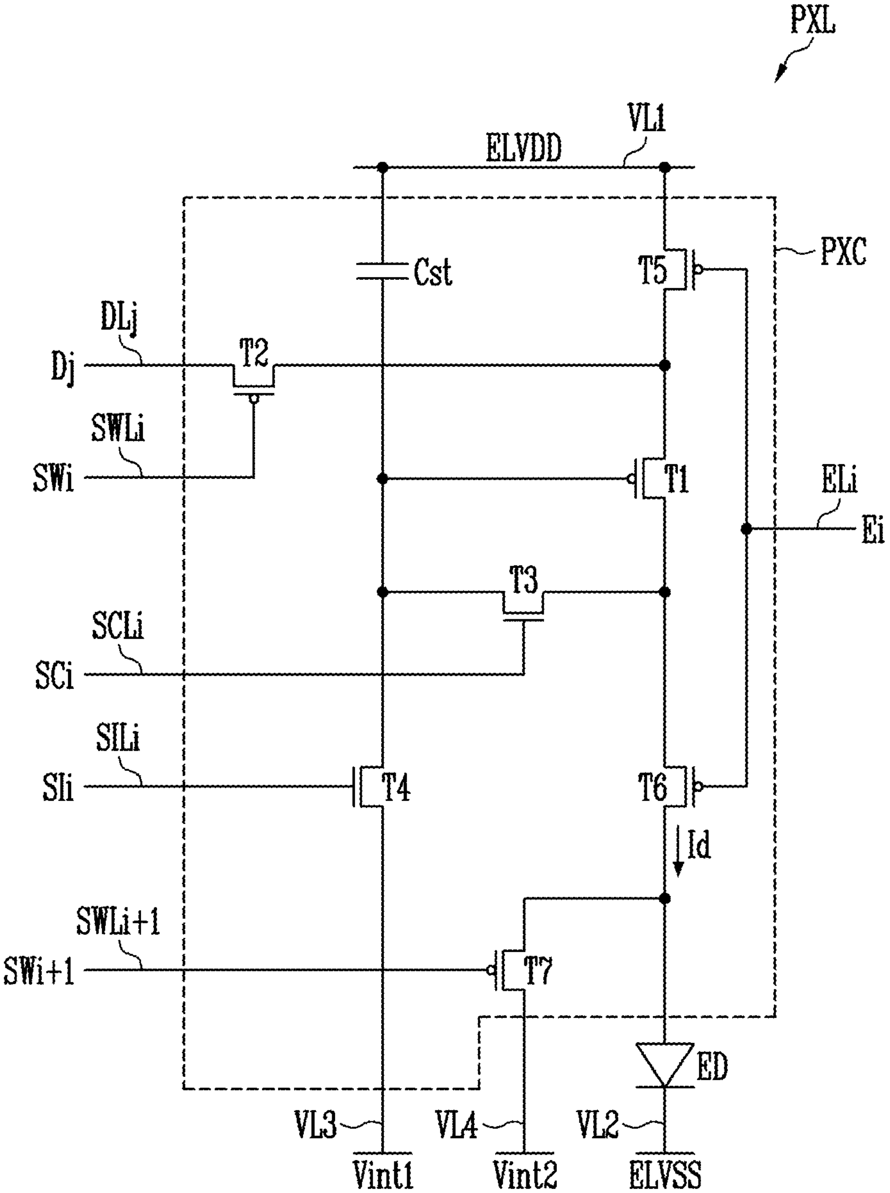
FIG. 2 is an exemplary circuit diagram of a pixel of FIG. 1.

FIG. 2 is an exemplary circuit diagram of the pixel of FIG. 1.

FIG. 2 exemplarily shows an equivalent circuit diagram of the pixel PXL connected to the j-th data line DLj among the data lines DL1-DLm shown in FIG. 1, the i-th scan lines SILi, SCLi, and SWLi among the scan lines SIL1 to SILn, SCL1 to SCLn, and SWL1 to SWLn, an (i+1)-th scan line SWLi+1, and the i-th emission control line ELi among the emission control lines EL1 to ELn.

Referring to FIG. 2, the pixel PXL of the display device according to an embodiment includes a pixel circuit PXC and at least one light emitting element ED. In an embodiment, the light emitting element ED may be a light emitting diode. In this embodiment, an example in which one pixel PXL includes one light emitting element ED is described. The pixel circuit PXC includes first to seventh transistors T1, T2, T3, T4, T5, T6, and T7 and a capacitor Cst.

In the embodiment shown in FIG. 2, the third and fourth transistors T3 and T4 among the first to seventh transistors T1 to T7 are N-type transistors having an oxide semiconductor as a semiconductor layer, and each of the first, second, fifth, sixth, and seventh transistors T1, T2, T5, T6, and T7 is a P-type transistor having a low-temperature polycrystalline silicon (LTPS) semiconductor layer. However, the disclosure is not limited thereto, and all of the first to seventh transistors T1 to T7 may be P-type transistors or N-type transistors. In another embodiment, at least one of the first to seventh transistors T1 to T7 may be an N-type transistor, and the rest may be a P-type transistors. In addition, a circuit configuration of the pixel according to the disclosure is not limited by FIG. 2. The pixel circuit PXC shown in FIG. 2 is only an example, and a configuration of the pixel circuit PXC may be modified and implemented.

The scan lines SILi, SCLi, SWLi, and SWLi+1 may transmit scan signals SIi, SCi, SWi, and SWi+1, respectively, and the emission control line ELi may transmit an emission control signal Ei. The data line DLj transmits a data signal Dj. The data signal Dj may have a voltage level corresponding to the voltage value VDATA input to the data driver 133 (refer to FIG. 1). First to fourth driving voltage lines VL1, VL2, VL3, and VL4 may transmit the first power voltage ELVDD, the second power voltage ELVSS, the first initialization voltage Vint1, and the second initialization voltage Vint2.

The first transistor T1 includes a first electrode connected to the first driving voltage line VL1 via the fifth transistor T5, a second electrode electrically connected to an anode of the light emitting element ED via the sixth transistor T6, and a gate electrode connected to one end of the capacitor Cst. The first transistor T1 may receive the data signal Dj transmitted by the data line DLj according to a switching operation of the second transistor T2 and supply a driving current Id to the light emitting element ED. The first transistor T1 may be referred to as a "driving transistor".

The second transistor T2 includes a first electrode connected to the data line DLj, a second electrode connected to the first electrode of the first transistor T1, and a gate electrode connected to the scan line SWLi. The second transistor T2 may be turned on according to a scan signal SWi transmitted through the scan line SWLi and may transmit the data signal Dj transmitted from the data line DLj to the first electrode of the first transistor T1.

The third transistor T3 includes a first electrode connected to the gate electrode of the first transistor T1, a second electrode connected to the second electrode of the first transistor T1, and a gate electrode connected to the scan line SCLi. The third transistor T3 may be turned on according to a scan signal SCi transmitted through the scan line SCLi and may diode-connect the first transistor T1 by connecting the gate electrode and the second electrode of the first transistor T1 to each other.

The fourth transistor T4 includes a first electrode connected to the gate electrode of the first transistor T1, a second electrode connected to the third driving voltage line VL3 to which the first initialization voltage Vint1 is transmitted, and a gate electrode connected to the scan line SILi. The fourth transistor T4 may be turned on according to a scan signal SIi transmitted through the scan line SILi to transmit the first initialization voltage Vint1 to the gate electrode of the first transistor T1, thereby performing an initialization operation of initializing a voltage of the gate electrode of the first transistor T1.

The fifth transistor T5 includes a first electrode connected to the first driving voltage line VL1, a second electrode connected to the first electrode of the first transistor T1, and a gate electrode connected to the emission control line ELi.

The sixth transistor T6 includes a first electrode connected to the second electrode of the first transistor T1, a second electrode connected to the anode of the light emitting element ED, and a gate electrode connected to the emission control line ELi.

The fifth transistor T5 and the sixth transistor T6 may be simultaneously turned on according to the emission control signal Ei transmitted through the emission control line ELi, and through this, the first driving voltage ELVDD may be compensated for through the diode-connected first transistor T1 and may transmitted to the light emitting element ED.

The seventh transistor T7 includes a first electrode connected to the second electrode of the sixth transistor T6, a second electrode connected to the fourth driving voltage line VL4, and a gate electrode connected to the scan line SWLi+1. The seventh transistor T7 is turned on according to a scan signal SWi+1 transmitted through the scan line SWLi+1 to bypass a current of the anode of the light emitting element ED to the fourth driving voltage line VL4.

One end of the capacitor Cst is connected to the gate electrode of the first transistor T1 as described above, and another end is connected to the first driving voltage line VL1. A cathode of the light emitting element ED may be connected to the second driving voltage line VL2 transmitting the second power voltage ELVSS. A structure of the pixel PXL according to an embodiment is not limited to the structure shown in FIG. 2, and the number of transistors and the number of capacitors included in one pixel PXL, and a connection relationship may be variously modified.

As described above, the first high voltage VGH1 may be the voltage for turning off the P-type transistor included in the pixel PXL. The first low voltage VGL1 may be the voltage for turning on the P-type transistor included in the pixel PXL. The second high voltage VGH2 may be the voltage for turning on the N-type transistor included in the pixel PXL. The second low voltage VGL2 may be the voltage for turning off the N-type transistor included in the pixel PXL.

Therefore, the first high voltage VGH1 or the first low voltage VGL1 may be applied to the i-th scan line SWLi, the i-th emission control line ELi, and the (i+1)-th scan line SWLi+1. In an embodiment, the second high voltage VGH2 or the second low voltage VGL2 may be applied to the i-th scan lines SCLi and SILi.

Figure 3:
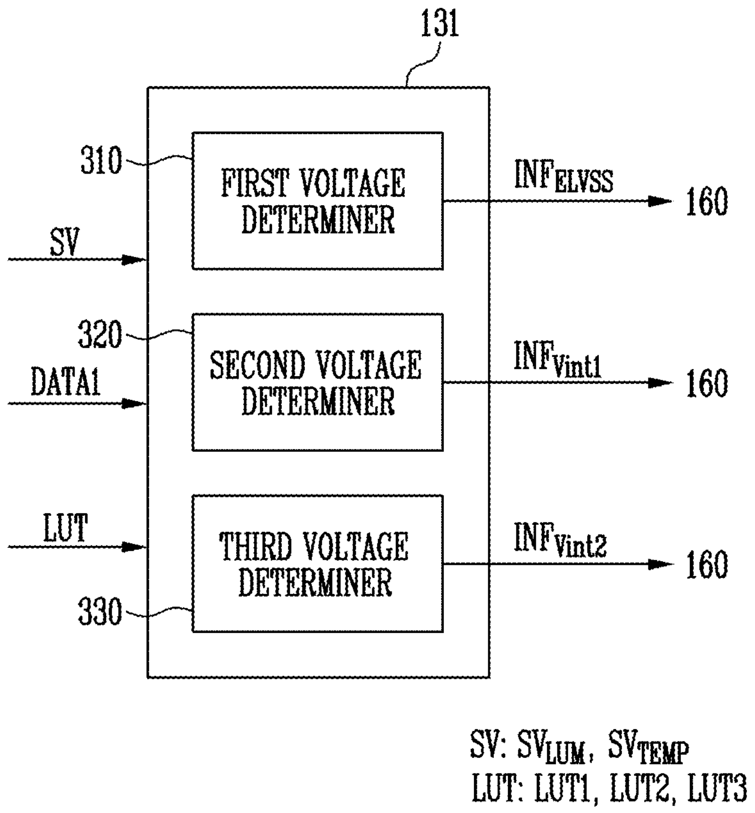
FIG. 3 is a block diagram illustrating an embodiment of a controller shown in FIG. 1.

FIG. 3 is a block diagram illustrating an embodiment of the controller shown in FIG. 1.

In order to improve a dynamic range of an image generated by the display panel 110, at least one voltage level of the voltages generated by the voltage generator 160 may be determined according to a luminance level of the image generated by the display panel 110. For example, the voltage level of the second power voltage ELVSS transmitted to the display panel 110 may be determined based on the luminance level of the image displayed by the display panel 110.

As an example, the luminance level of the image displayed by the display panel 110 may be determined by the controller 131 based on the input image data DATA1 provided to the controller 131. For example, when an average grayscale level of the input image data DATA1 is high, the luminance level of the image displayed by the display panel 110 may be high.

As another example, the display device 100 may adjust the luminance level of the display panel 110 according to an illuminance around the display device 100 in order to increase visibility of the image displayed on the display panel 110. For example, when the illuminance around the display device 100 is low, the display device 100 may display an image with a relatively low luminance, and when the illuminance around the display device 100 is high, the display device 100 may display an image with a relatively high luminance.

In summary, the luminance level of the image displayed by the display panel 110 may be determined based on at least one of the illuminance around the display device 100 and the average grayscale level of the input image data DATA1.

In addition, in consideration of a characteristic of the transistors configuring the pixel PXL included in the display panel 110, the voltage level of at least one of the voltages generated by the voltage generator 160 may be determined according to the temperature of the display panel 110. For example, the voltage level of the second power voltage ELVSS transmitted to the display panel 110 may be determined according to the temperature of the display panel 110.

In summary, the voltage level of the second power voltage ELVSS may be determined based on the luminance level of the display panel 110 and the temperature of the display panel 110. The controller 131 may determine the voltage level of the second power voltage ELVSS by referring to the lookup table LUT provided from the memory 140. Hereinafter, the disclosure is described in more detail with reference to FIG. 3.

Referring to FIG. 3, the controller 131 may include a first voltage determiner 310, a second voltage determiner 320, and a third voltage determiner 330. In addition, the controller 131 may receive the lookup table LUT from the memory 140. In an embodiment, the controller 131 may receive the sensing value SV from the sensor 170. In addition, the controller 131 may receive the input image data DATA1.

The first voltage determiner 310 may determine the voltage level of the second power voltage ELVSS based on at least one of the luminance level and the temperature value. As described above, the luminance level of the image displayed by the display panel 110 may be determined based on at least one of the illuminance around the display device 100 and the average grayscale level of the input image data DATA1. Therefore, the first voltage determiner 310 may determine the luminance level based on the illuminance sensing value $SV_{LUM}$ and the input image data DATA1. In an embodiment, the first voltage determiner 310 may determine the voltage level of the second power voltage ELVSS based on the determined luminance level and the temperature sensing value $SV_{TEMP}$ and generate the voltage information $INF_{ELVSS}$ corresponding thereto.

At this time, the first voltage determiner 310 may determine the voltage level of the second power voltage ELVSS by referring to a first lookup table LUT1. [Table 1] below illustrates an exemplary embodiment of the first lookup table LUT1.

TABLE 1

| Luminance range (Nits) | Temperature range(° C.) Lower than −10 | −10~0 | 0~10 | 10~20 | 20~30 | 30~40 | 40~50 | 50 or higher |
|---|---|---|---|---|---|---|---|---|
| Lower than 4 | V11 | V12 | V13 | V14 | V15 | V16 | V17 | V18 |
| 4~10 | V21 | V22 | V23 | V24 | V25 | V26 | V27 | V28 |
| 10~15 | V31 | V32 | V33 | V34 | V35 | V36 | V37 | V38 |
| 15~30 | V41 | V42 | V43 | V44 | V45 | V46 | V47 | V48 |
| 30~60 | V51 | V52 | V53 | V54 | V55 | V56 | V57 | V58 |
| 60~100 | V61 | V62 | V63 | V64 | V65 | V66 | V67 | V68 |
| 100~200 | V71 | V72 | V73 | V74 | V75 | V76 | V77 | V78 |

For example, when the luminance level of the display panel 110 is 80 Nits and the temperature of the display panel 110 is 28° C., V65 may be determined as the voltage level of the second power voltage ELVSS. In an exemplary embodiment, a relatively lower voltage level may be determined as the second power voltage ELVSS as the temperature is relatively higher. In addition, a relatively lower voltage level may be determined as the second power voltage ELVSS as the luminance level is relatively higher. However, this is exemplary, and various types of lookup tables different from Table 1 may be used as the first lookup table LUT1 for determining the voltage level of the second power voltage ELVSS.

For example, the voltage level of the second power voltage ELVSS may be determined based on the luminance level of the display panel 110 regardless of the temperature.

In addition, the luminance level may be determined based on the input image data DATA1 regardless of the illuminance around the display panel 110.

The second voltage determiner 320 may determine the voltage level of the first initialization voltage Vint1 based on at least one of the luminance level and the temperature value. As described above, the luminance level of the image displayed by the display panel 110 may be determined based on at least one of the illuminance around the display device 100 and the average grayscale level of the input image data DATA1. Therefore, the second voltage determiner 320 may determine the luminance level based on the illuminance sensing value $SV_{LUM}$ and the input image data DATA1. In an embodiment, the second voltage determiner 320 may determine the voltage level of the first initialization voltage Vint1 based on the determined luminance level and the temperature sensing value $SV_{TEMP}$, and generate the voltage information $INF_{Vint1}$ corresponding thereto.

At this time, the second voltage determiner 320 may determine the voltage level of the first initialization voltage Vint1 by referring to a second lookup table LUT2. The second lookup table LUT2 may have a form similar to the form of the first lookup table LUT1, and thus a specific example of the second lookup table LUT2 is omitted.

The third voltage determiner 330 may determine the voltage level of the second initialization voltage Vint2 based on at least one of the luminance level and the temperature value. As described above, the luminance level of the image displayed by the display panel 110 may be determined based on at least one of the illuminance around the display device 100 and the average grayscale level of the input image data DATA1. Therefore, the third voltage determiner 330 may determine the luminance level based on the illuminance sensing value $SV_{LUM}$ and the input image data DATA1. In an embodiment, the third voltage determiner 330 may determine the voltage level of the second initialization voltage Vint2 based on the determined luminance level and the temperature sensing value $SV_{TEMP}$ and generate the voltage information $INF_{Vint2}$ corresponding thereto.

At this time, the third voltage determiner 330 may determine the voltage level of the second initialization voltage Vint2 by referring to a third lookup table LUT3. The third lookup table LUT3 may have a form similar to the form of the first lookup table LUT1 or the second lookup table LUT2, and thus a specific example of the third lookup table LUT3 is omitted.

As described above with reference to FIG. 3, the display device 100 according to an embodiment of the disclosure may determine the voltage level of at least one of the second power voltage ELVSS, the first initialization voltage Vint1, and the second initialization voltage Vint2 based on at least one of the luminance level of the image displayed by the display panel 110 or the temperature around the display panel 110. Accordingly, the optimal second power voltage ELVSS, first initialization voltage Vint1, and second initialization voltage Vint2 may be supplied under various luminance level conditions and temperature conditions.

However, according to the embodiment shown in FIG. 3, the fixed gate voltage VG, that is, the fixed first high voltage VGH1, first low voltage VGL1, second high voltage VGH2, and the second low voltage VGL2 may be used. At this time, the first low voltage VGL1 and the second low voltage VGL2 may be conservatively determined so as to be applicable to all of the variable second power voltage ELVSS, first initialization voltage Vint1, and second initialization voltage Vint2. Specifically, the first low voltage VGL1 and the second low voltage VGL2 may be determined correspondingly to the second power voltage ELVSS corresponding to the lowest voltage level among voltage levels included in the first lookup table LUT1, the first initialization voltage Vint1 corresponding to the lowest voltage level among voltage levels included in the second lookup table LUT2, and the second initialization voltage Vint2 corresponding to the lowest voltage level among voltage levels included in the third lookup table LUT3. In this case, the first low voltage VGL1 and the second low voltage VGL2 having the conservatively low voltage level are used despite changes in the second power voltage ELVSS, the first initialization voltage Vint1, and the second initialization voltage Vint2. In a case where the second power voltage ELVSS, the first initialization voltage Vint1, and the second initialization voltage Vint2 are used at a relatively high voltage level, the first low voltage VGL1 and the second low voltage VGL2 may use an unnecessarily low voltage level, and this causes a missed opportunity of reducing power used by the display device 100.

According to another embodiment of the disclosure, the display device 100 dynamically changes the first low voltage VGL1 and the second low voltage VGL2 correspondingly to changes in the second power voltage ELVSS, the first initialization voltage Vint1, and the second initialization voltage Vint2. Accordingly, power consumption of the display device 100 may be reduced even though the second power voltage ELVSS, the first initialization voltage Vint1, and the second initialization voltage Vint2 are dynamically changed in a wide luminance range.

Figure 4:
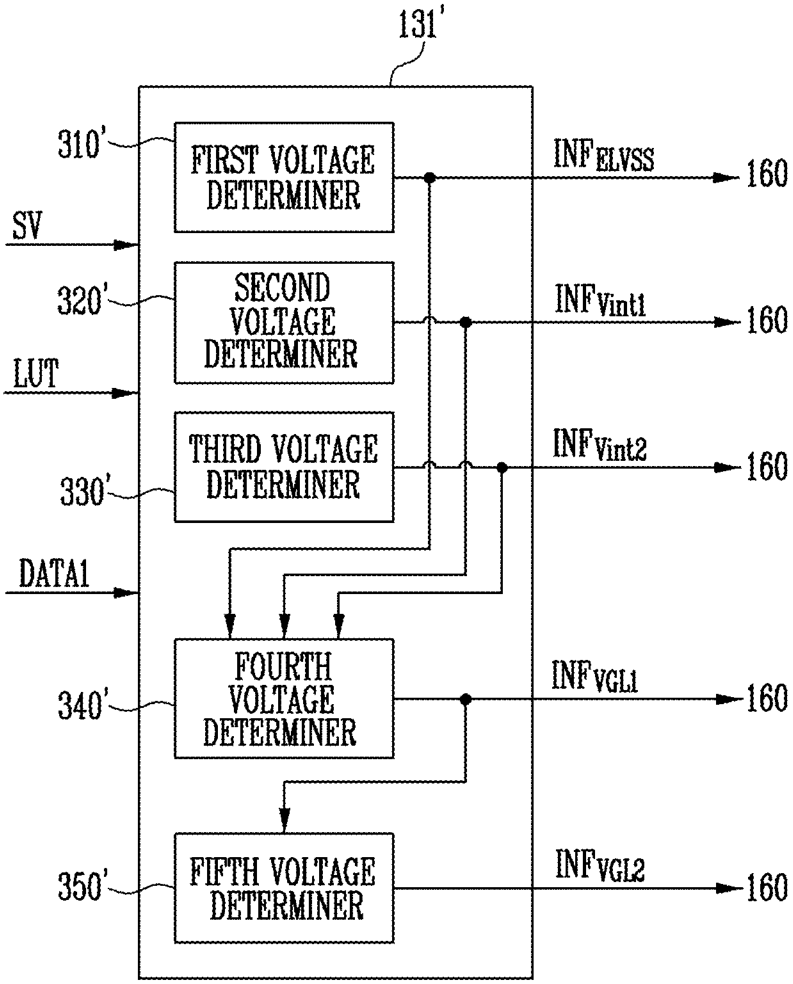
FIG. 4 is a block diagram illustrating another embodiment of the controller shown in FIG. 1.

FIG. 4 is a block diagram illustrating another embodiment of the controller shown in FIG. 1.

Referring to FIG. 4, the controller 131' may include a first voltage determiner 310', a second voltage determiner 320', a third voltage determiner 330', a fourth voltage determiner 340', and a fifth voltage determiner 350'. In addition, the controller 131' may receive the lookup table LUT from the memory 140. In an embodiment, the controller 131' may receive the sensing value SV from the sensor 170. In addition, the controller 131' may receive the input image data DATA1. Among components shown in FIG. 4, the first voltage determiner 310', the second voltage determiner 320', and the third voltage determiner 330' may be substantially the same components as the first voltage determiner 310, the second voltage determiner 320, and the third voltage determiner 330 described with reference to FIG. 3, respectively. Therefore, an overlapping description of the first voltage determiner 310', the second voltage determiner 320', and the third voltage determiner 330' is omitted. Similarly to that described above with reference to FIG. 3, the first voltage determiner 310', the second voltage determiner 320', and the third voltage determiner 330' may determine each of the voltage levels of the second power voltage ELVSS, the first initialization voltage Vint1, and the second initialization voltage Vint2, based on at least one of the luminance level and the temperature value, and generate the voltage information $INF_{ELVSS}$, $INF_{Vint1}$, and $INF_{Vint2}$ corresponding thereto, respectively.

The fourth voltage determiner 340' may determine a voltage level of the first low voltage VGL1 based on the determined voltage level of the second power voltage ELVSS, the first initialization voltage Vint1, and the second initialization voltage Vint2. To this end, the fourth voltage determiner 340' may receive the voltage information $INF_{ELVSS}$, $INF_{Vint1}$, and $INF_{Vint2}$ respectively corresponding to the voltage levels of the second power voltage ELVSS, the first initialization voltage Vint1, and the second initialization voltage Vint2.

As described above, the first low voltage VGL1 may be the voltage for turning on the P-type transistor of the pixel shown in FIG. 2. To this end, the first low voltage VGL1 is required to have a voltage level lower than the lowest voltage among the second power voltage ELVSS, the first initialization voltage Vint1, and the second initialization voltage Vint2. Therefore, the fourth voltage determiner 340' may determine the voltage level of the first low voltage VGL1 by the following Formula 1.

$$VGL1 = \min(ELVSS, Vint1, Vint2) - \Delta V1. \quad \text{[Formula 1]}$$

In the Formula 1, ΔV1 may be a predetermined positive value, and the first low voltage VGL1 may be a value corresponding to a voltage margin with respect to the lowest voltage among the 10 second power voltage ELVSS, the first initialization voltage Vint1, and the second initialization voltage Vint2. In an embodiment, ΔV1 may be a threshold voltage value of a P-type transistor, for example, the seventh transistor T7 shown in FIG. 2. The fourth voltage determiner 340' generates voltage information $INF_{VGL1}$ corresponding to the determined voltage level of the first low voltage VGL1. The generated voltage information $INF_{VGL1}$ may be transmitted to the voltage generator 160.

As described above, the fourth voltage determiner 340' may determine the voltage level of the first low voltage VGL1 based on the determined voltage level of the second power voltage ELVSS, the first initialization voltage Vint1, and the second initialization voltage Vint2. Therefore, the first low voltage VGL1 also dynamically changes correspondingly to changes in the second power voltage ELVSS, the first initialization voltage Vint1, and the second initialization voltage Vint2. Accordingly, even though the second power voltage ELVSS, the first initialization voltage Vint1, and the second initialization voltage Vint2 are dynamically changed in a wide luminance range, power consumption of the display device 100 may be reduced.

In an embodiment, the fifth voltage determiner 350' may determine a voltage level of the second low voltage VGL2 based on the determined voltage level of the first low voltage VGL1. To this end, the fifth voltage determiner 350' may receive the voltage information $INF_{VGL1}$ corresponding to the voltage level of the first low voltage VGL1.

As described above, the second low voltage VGL2 may be the voltage for turning off the N-type transistor of the pixel shown in FIG. 2. To this end, the second low voltage VGL2 may have a voltage level slightly higher than the first voltage VGL1. An exemplary embodiment of the fifth voltage determiner 350' is described with reference to FIG. 5.

Figure 5:
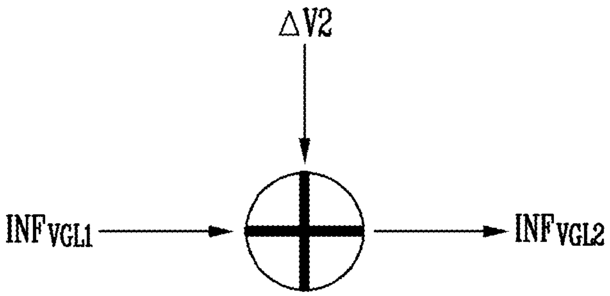
FIG. 5 is an exemplary embodiment of a fifth voltage determiner shown in FIG. 4.

FIG. 5 is a block diagram illustrating an exemplary embodiment of the fifth voltage determiner shown in FIG. 4. Hereinafter, the disclosure is described with reference to FIGS. 4 and 5 together.

Referring to FIG. 5, the fifth voltage determiner 350' may determine the voltage level of the second low voltage VGL2 by the following Formula 2:

$$VGL2 = VGL1 + \Delta V2. \quad \text{[Formula 2]}$$

In the Formula 2, ΔV2 may be a predetermined fixed positive value. In an exemplary embodiment, ΔV2 may be determined according to the luminance of the image displayed on the display panel 110 or the temperature around the display panel 110 by the fifth voltage determiner 350'. In this case, a lookup table including values of ΔV2 corresponding to each of the luminance of the image displayed on the display panel 110 or the temperature around the display panel 110 may be provided to the fifth voltage determiner 350'.

As described above, the fifth voltage determiner 350' determines the voltage level of the second low voltage VGL2 based on the voltage level of the first low voltage VGL1. Since the voltage level of the first low voltage VGL1 is determined based on the voltage level of the second power voltage ELVSS, the first initialization voltage Vint1, and the second initialization voltage Vint2, the second low voltage VGL2 also dynamically changes correspondingly to changes in the second power voltage ELVSS, the first initialization voltage Vint1, and the second initialization voltage Vint2. Accordingly, even though the second power voltage ELVSS, the first initialization voltage Vint1, and the second initialization voltage Vint2 are dynamically changed in a wide luminance range, power consumption of the display device 100 may be reduced.

Figure 6:
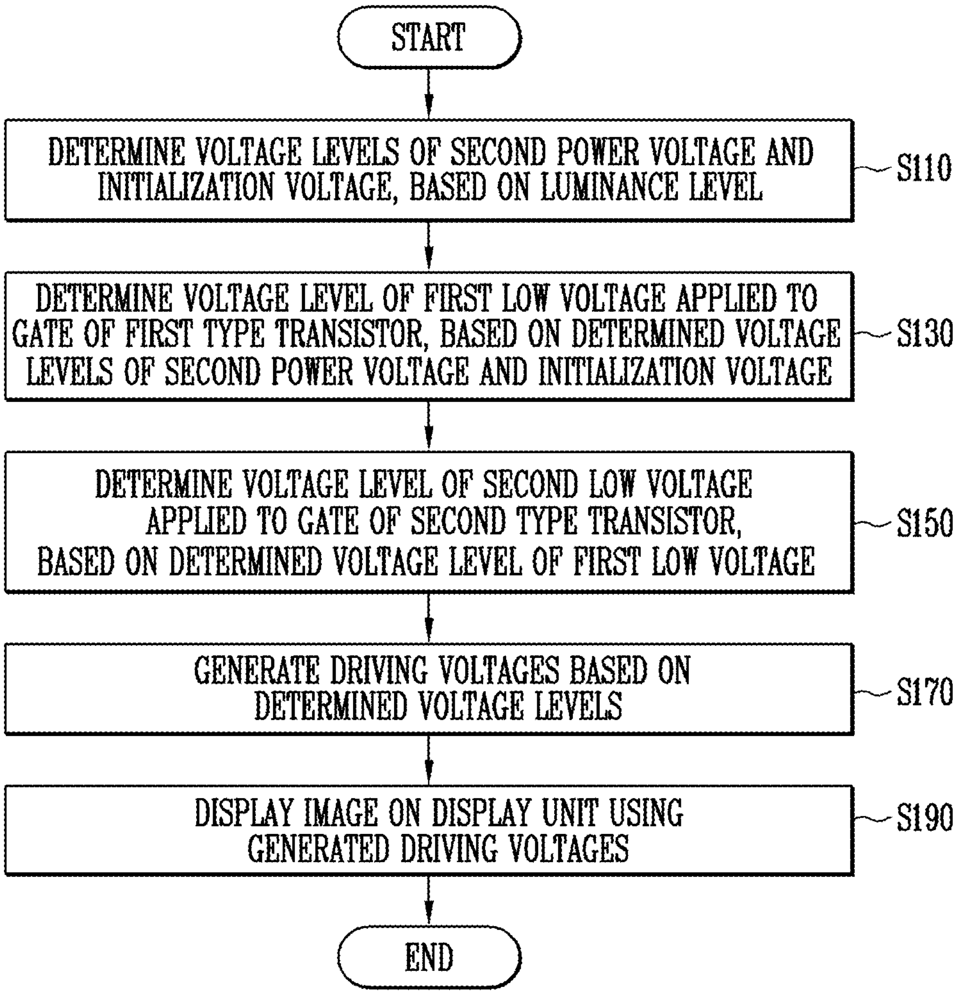
FIG. 6 is a flowchart illustrating a method of operating a display device according to an embodiment of the disclosure.

FIG. 6 is a flowchart illustrating a method of operating a display device according to an embodiment of the disclosure. Hereinafter, the disclosure is described with reference to FIGS. 4 and 6 together.

Referring to FIG. 6, the method of operating the display device includes determining a level of a second power voltage and an initialization voltage based on a luminance level (S110), determining a first low voltage level applied to a gate of a first type transistor based on the determined level of the second power voltage and the initialization voltage (S130), determining a second low voltage level applied to a gate of a second type transistor based on the determined first low voltage level (S150), generating driving voltages based on the determined voltage levels (S170), and displaying an image on a display unit by using the generated driving voltages (S190).

In step S110, the first voltage determiner 310' of FIG. 4 may determine the voltage level of the second power voltage ELVSS based on the luminance level. Although FIG. 6 shows that the voltage level of the second power voltage ELVSS is determined based on the luminance level in step S110, the disclosure is not limited thereto. As described with reference to table 1, the first voltage determiner 310' may determine the voltage level of the second power voltage ELVSS based on the luminance level and the temperature around the display panel 110. At this time, the first voltage determiner 310' may determine the voltage level of the second power voltage ELVSS by referring to the first lookup table LUT1.

In an embodiment, in step S110, the second voltage determiner 320' of FIG. 4 may determine the voltage level of the first initialization voltage Vint1 based on the luminance level. In addition, in step S110, the third voltage determiner 330' of FIG. 4 may determine the voltage level of the second initialization voltage Vint2 based on the luminance level. The initialization voltage shown in FIG. 6 may include the first initialization voltage Vint1 and the second initialization voltage Vint2.

In step S130, the fourth voltage determiner 340' of FIG. 4 may determine the voltage level of the first low voltage VGL1 for turning on the P-type transistor based on the determined voltage level of the second power voltage ELVSS, the first initialization voltage Vint1, and the second initialization voltage Vint2. The first type transistor described in step S130 may be the P-type transistor. To this end, the fourth voltage determiner 340' may determine the voltage level of the first low voltage VGL1 by the above-described Formula 1.

In step S150, the fifth voltage determiner 350' of FIG. 4 may determine the voltage level of the second low voltage VGL2 based on the determined voltage level of the first low voltage VGL1. The second type transistor described in step S150 may be the N-type transistor. To this end, the fifth voltage determiner 350' may determine the voltage level of the second low voltage VGL2 by the above-described Formula 2.

After step S150, the voltage information $INF_{ELVSS}$, $INF_{Vint1}$, $INF_{Vint2}$, $INF_{VGL1}$, and $INF_{VGL2}$ corresponding to the determined voltage levels may be transmitted to the voltage generator 160. In step S170, the voltage generator 160 may generate the driving voltages, that is, the second power voltage ELVSS, the first initialization voltage Vint1, the second initialization voltage Vint2, the first low voltage VGL1, and the second low voltage VGL2, based on the received voltage information $INF_{ELVSS}$, $INF_{Vint1}$, $INF_{Vint2}$, $INF_{VGL1}$, and $INF_{VGL2}$.

Figure 9:
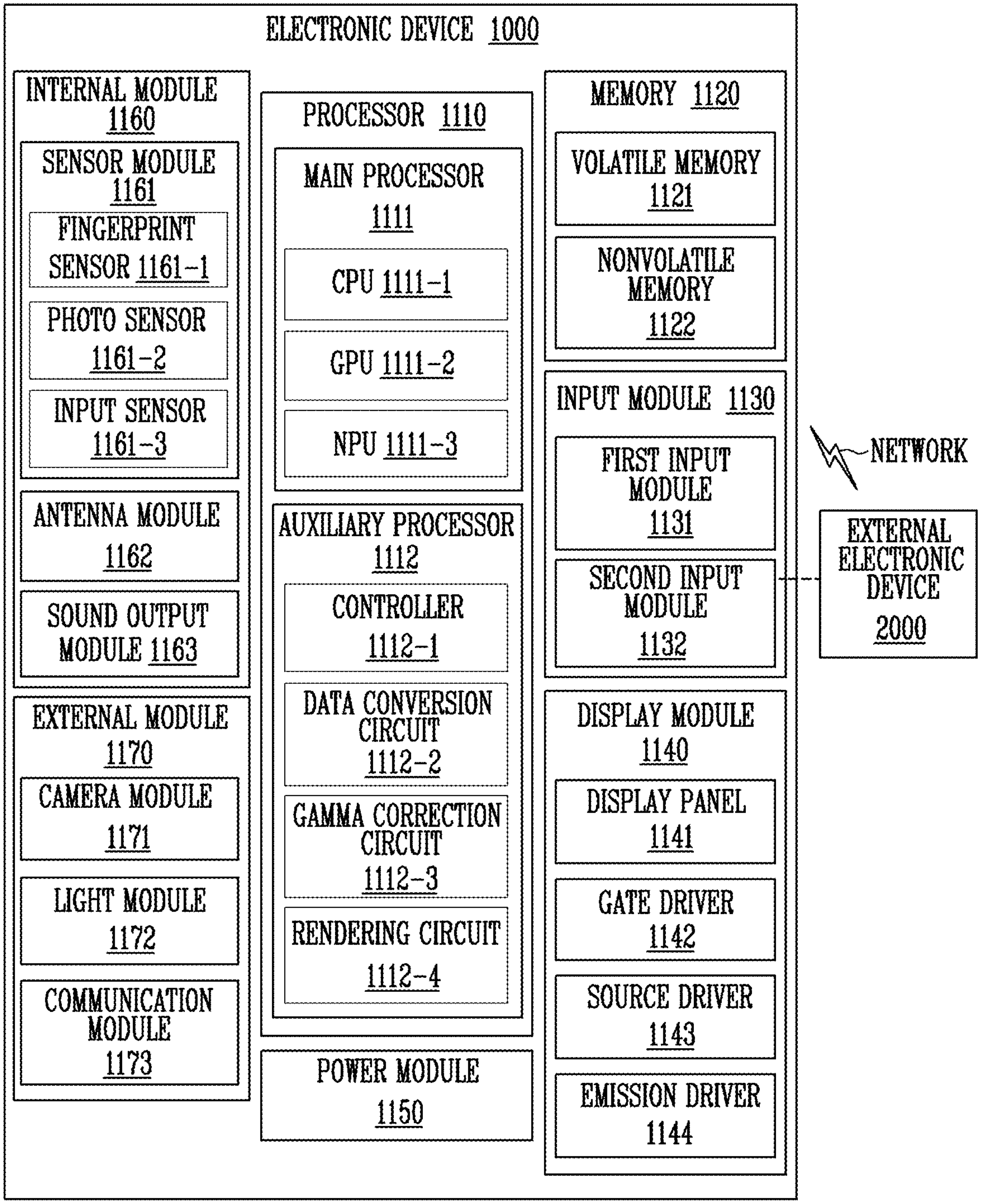
FIG. 9 is a drawing illustrating an electronic device according to still another embodiment of the disclosure.

The display unit shown in step S190 of FIG. 9 may be the display panel 110 shown in FIG. 1. In step S190, the voltage generator 160 transmits the generated driving voltages to other components of the display device. In addition, in step S190, the data driver 133 transmits the data signal according to the generated voltage value VDATA to the display panel 110. Accordingly, the display device may display an image on the display panel 110 using the changed driving voltage.

Figure 7:
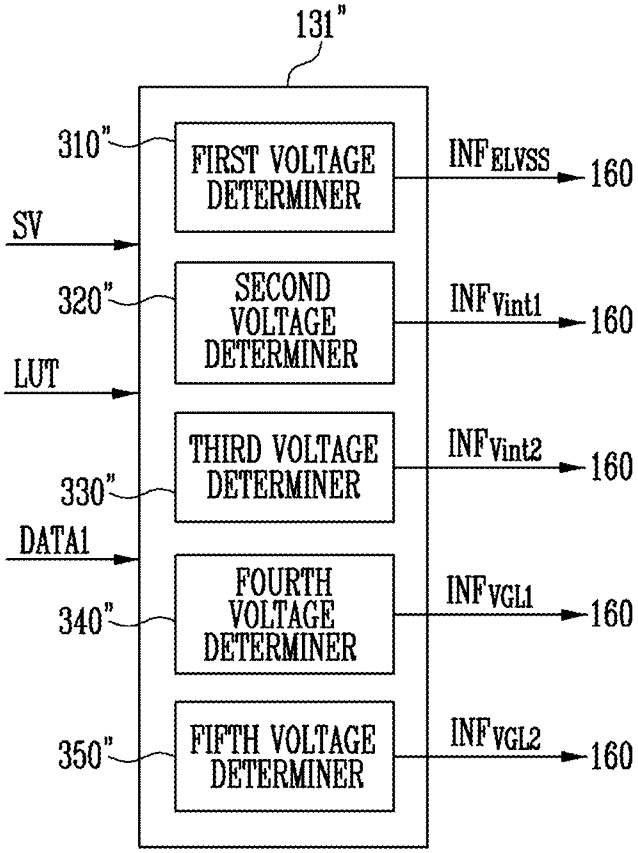
FIG. 7 is a block diagram illustrating still another embodiment of the controller shown in FIG. 1.

FIG. 7 is a block diagram illustrating still another embodiment of the controller shown in FIG. 1.

Referring to FIG. 7, the controller 131" may include a first voltage determiner 310", a second voltage determiner 320", a third voltage determiner 330", a fourth voltage determiner 340", and a fifth voltage determiner 350". In addition, the controller 131" may receive the lookup table LUT from the memory 140. In an embodiment, the controller 131" may receive the sensing value SV from the sensor 170. In addition, the controller 131" may receive the input image data DATA1. Among the components shown in FIG. 7, the first voltage determiner 310", the second voltage determiner 320", and the third voltage determiner 330" may be substantially the same components as the first voltage determiner 310', the second voltage determiner 320', and the third voltage determiner 330' described with reference to FIG. 4, respectively. Therefore, an overlapping description of the first voltage determiner 310", the second voltage determiner 320", and the third voltage determiner 330" is omitted. Similarly to that described above with reference to FIGS. 3 and 4, the first voltage determiner 310", the second voltage determiner 320", and the third voltage determiner 330" may determine the voltage level of the second power voltage ELVSS, the first initialization voltage Vint1, and the second initialization voltage Vint2, respectively, based on at least one of the luminance level and the temperature value, and generate the voltage information $INF_{ELVSS}$, $INF_{Vint1}$, and $INF_{Vint2}$ corresponding thereto, respectively.

In an embodiment, the fourth voltage determiner 340" may determine the voltage level of the first low voltage VGL1 based on at least one of the luminance level and the temperature value. As described above, the luminance level of the image displayed by the display panel 110 may be determined based on at least one of the illuminance around the display device 100 and the average grayscale level of the input image data DATA1. Therefore, the fourth voltage determiner 340" may determine the luminance level based on the illuminance sensing value $SV_{LUM}$ and the input image data DATA1. In an embodiment, the fourth voltage determiner 340" may determine the voltage level of the first low voltage VGL1 based on the determined luminance level and the temperature sensing value $SV_{TEMP}$, and generate the voltage information $INF_{VGL1}$ corresponding thereto.

At this time, the fourth voltage determiner 340" may determine the voltage level of the first low voltage VGL1 by referring to a fourth lookup table LUT4. The fourth lookup table LUT4 may have a form similar to the form of the first lookup table LUT1, and thus a specific example of the fourth lookup table LUT4 is omitted.

In an embodiment, the voltage level of the first low voltage VGL1 corresponding to each luminance level and temperature sensing value in the fourth lookup table LUT4 may be determined in advance through the second power voltage ELVSS, the first initialization voltage Vint1, and the second initialization voltage Vint2 determined by the first lookup table LUT1, the second lookup table LUT2, and the third lookup table LUT3, respectively, and the above-described Formula 1. That is, the fourth lookup table LUT4 may be determined from the second power voltage ELVSS, the first initialization voltage Vint1, and the second initialization voltage Vint2 selected according to each luminance level condition and temperature condition.

According to the embodiment shown in FIGS. 4 to 6, the fourth voltage determiner 340' calculates the first low voltage VGL1 from the second power voltage ELVSS, the first initialization voltage Vint1, and the second initialization voltage Vint2 through the Formula 1. On the other hand, according to the embodiment shown in FIG. 7, the fourth voltage determiner 340" may determine the voltage level of the first low voltage VGL1 by referring to the fourth lookup table LUT4 without a calculation process such as the Formula 1.

In addition, the fifth voltage determiner 350" may determine the voltage level of the second low voltage VGL2 based on at least one of the luminance level and the temperature value. At this time, the fifth voltage determiner 350" may determine the voltage level of the second low voltage VGL2 by referring to the fifth lookup table LUT5. The fifth lookup table LUT5 may have a form similar to the form of the fourth lookup table LUT4, and thus a specific example of the fifth lookup table LUT5 is omitted.

In an embodiment, the voltage level of the second low voltage VGL2 corresponding to each luminance level and temperature sensing value in the fifth lookup table LUT5 may be determined in advance through the first low voltage VGL1 determined by the fourth lookup table LUT4 and the above-described Formula 2. That is, the fifth lookup table LUT5 may be determined from the first low voltage VGL1 selected according to each luminance level condition and temperature condition using the Formula 2.

According to the embodiment shown in FIGS. 4 to 6, the fifth voltage determiner 350' calculates the second low voltage VGL2 from the first low voltage VGL1 through the Formula 2. On the other hand, according to the embodiment shown in FIG. 7, the fifth voltage determiner 350" may determine the voltage level of the second low voltage VGL2 by referring to the fifth lookup table LUT5 without a calculation process such as the Formula 2.

Figure 8:
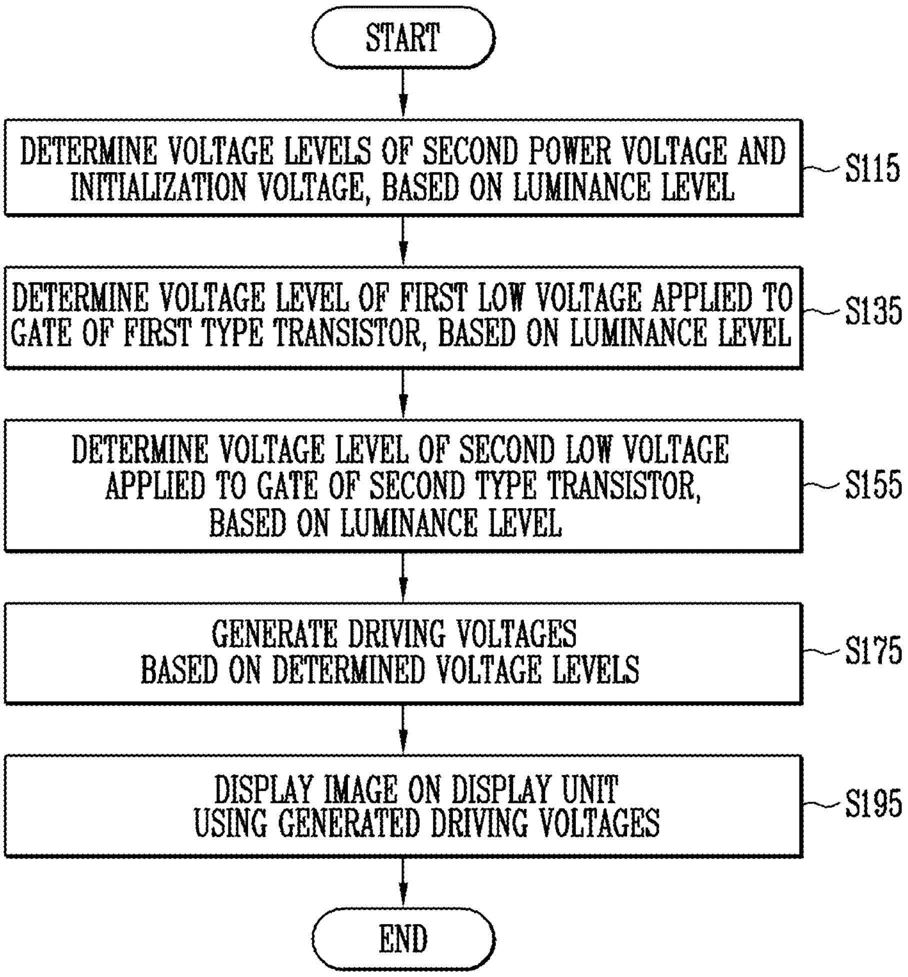
FIG. 8 is a flowchart illustrating a method of operating a display device according to another embodiment of the disclosure.

FIG. 8 is a flowchart illustrating a method of operating a display device according to another embodiment of the disclosure.

Referring to FIG. 8, the method of operating the display device includes determining a level of a second power voltage and an initialization voltage based on a luminance level (S115), determining a first low voltage level applied to a gate of a first type transistor based on the luminance level (S135), determining a second low voltage level applied to a gate of a second type transistor based on the luminance level (S155), generating driving voltages based on the determined voltage levels (S175), and displaying an image on a display unit using the generated driving voltages (S195). Steps S115, S175, and S195 of FIG. 8 may be substantially the same as steps S110, S170, and S190 of FIG. 6, respectively. Therefore, an overlapping description thereof is omitted.

In step S135, the fourth voltage determiner 340" of FIG. 7 may determine the voltage level of the first low voltage VGL1 by referring to the fourth lookup table LUT4.

In an embodiment, in step S155, the fifth voltage determiner 350" of FIG. 7 may determine the voltage level of the second low voltage VGL2 by referring to the fifth lookup table LUT5.

In FIG. 8, after determining the level of the second power voltage and the initialization voltage (S115), the first low voltage level VGL1 is determined (S135), and then the second low voltage level VGL2 is determined (S155), but the disclosure is not limited thereto. Steps S115, S135, and S155 may be performed substantially simultaneously, and thus according to the embodiment of FIG. 7 and FIG. 8, a time required to determine the voltage levels of the second power voltage ELVSS, the first initialization voltage Vint1, the second initialization voltage Vint2, the first low voltage VGL1, and the second low voltage VGL2 is relatively short. On the other hand, according to the embodiment of FIGS. 7 and 8, since additional fourth and fifth lookup tables LUT4 and LUT5 are required, a space required to store the lookup table LUT in the memory 140 is relatively larger.

As described above, according to another embodiment of the disclosure, the display device 100 dynamically changes the first low voltage VGL1 and the second low voltage VGL2 correspondingly to changes in the second power voltage ELVSS, the first initialization voltage Vint1, and the second initialization voltage Vint2. Accordingly, even though the second power voltage ELVSS, the first initialization voltage Vint1, and the second initialization voltage Vint2 are dynamically changed in a wide luminance range, power consumption of the display device 100 may be reduced.

FIG. 9 is a diagram illustrating an electronic device according to still another embodiment of the disclosure.

Referring to FIG. 9, the electronic device according to an embodiment of the disclosure outputs various pieces of information through a display module 1140. The display module 1140 may correspond to at least a portion of the display device 100 of FIG. 1. When a processor 1110 executes an application stored in a memory 1120, the display module 1140 provides application information to a user through a display panel 1141. The display panel 1141 may be a configuration corresponding to the display panel 110 of FIG. 1.

The processor 1110 obtains an external input through an input module 1130 or a sensor module 1161 and executes an application corresponding to the external input. For example, when the user selects a camera icon displayed on the display panel 1141, the processor 1110 obtains a user input through an input sensor 1161-3 and activates a camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141.

As still another example, when a music streaming icon displayed on the display module 1140 is selected, the processor 1110 obtains a user input through the input sensor 1161-3 and activates a music streaming application stored in the memory 1120. When a music execution command is input in the music streaming application, the processor 1110 activates a sound output module 1163 to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122.

The processor 1110 may include a main processor 1111 and an auxiliary processor 1112. The auxiliary processor 1112 may correspond to at least a partial configuration of the controller 131 or the data converter 132 of FIG. 1.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 receives an image signal from the main processor 1111, converts a data format of the image signal to correspond to an interface specification with the display module 1140, and outputs image data.

The controller 1112-1 may output various control signals necessary for driving the display module 1140.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to a characteristic of the electronic device 1000, a setting of the user, or the like, or convert the image data for reduction of power consumption, afterimage compensation, or the like.

The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described later.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122. The memory 140 of FIG. 1 may correspond to a partial configuration of the memory 1120 of FIG. 9.

The input module 1130 may receive a command or data to be used by a component (for example, the processor 1110, the sensor module 1161, or the sound output module 1163) of the electronic device 1000 from an outside (for example, the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include a display panel 1141, a gate driver 1142, a source driver 1143, and an emission driver 1144. The gate driver 1142 may correspond to at least a portion of the scan driver 120 shown in FIG. 1. The source driver 1143 may correspond to at least a portion of the data driver 133 shown in FIG. 1. The emission driver 1144 may correspond to at least a portion of the emission driver 150 shown in FIG. 1. The display module 1140 may further include a window, a chassis, and a bracket for protecting the display panel 1141.

The display panel 1141 (or a display) may include a liquid crystal display panel, an organic light emitting display panel, or an inorganic light emitting display panel, and a type of the display panel 1141 is not particularly limited. The display panel 1141 may be a rigid type or a flexible type that may be rolled or folded. The display module 1140 may further include a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 1141. The gate driver 1142 receives the first control signal CS1 or the second control signal CS2 from the controller 1112-1 and outputs the scan signals to the display panel 1141 in response to the first control signal CS1 or the second control signal CS2.

The emission driver 1144 may be mounted on the display panel 1141 as a driving chip. In addition, the emission driver 1144 may be integrated into the display panel 1141 similarly to the gate driver 1142. The emission driver 1144 outputs the emission control signal to the display panel 1141 in response to the first control signal CS1 and the second control signal CS2 received from the controller 1112-1. The emission driver 1144 may be formed separately from the gate driver 1142 or integrated into the gate driver 1142. Additionally, the emission driver 1144 may generate the emission control signal in response to the emission start signal supplied from the start signal controller 516.

The source driver 1143 receives the first control signal CS1 or the second control signal CS2 from the controller 1112-1, converts image data into an analog voltage (for example, a data signal) in response to the first control signal CS1 or the second control signal CS2, and then outputs the data signals to the display panel 1141.

The source driver 1143 may be integrated into another component (for example, the controller 1112-1). A function of the interface conversion circuit and the timing control circuit of the controller 1112-1 described above may be integrated into the source driver 1143.

The display module 1140 may further include a voltage generation circuit. The voltage generation circuit may output various voltages necessary for driving the display panel 1141. In an embodiment, the display panel 1141 may include a plurality of pixel columns each including a plurality of pixels.

In an embodiment, the source driver 1143 may convert data corresponding to red (R), green (G), and blue (B) (for example, the output data Dout) into a red data signal (or data voltage), a green data signal, and the blue data signal, and may provide the red data signal, the green data signal, and the blue data signal to the plurality of pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described module and a module to be described later. At least a portion of the voltage generator 160 of FIG. 1 may be included in the power module 1150 of FIG. 9. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. In addition, the sensor module 1161 may sense an external environment (for example, illuminance, temperature, and the like) and generate an electrical signal or a data value corresponding to the external environment. At least a portion of the sensor 170 of FIG. 1 may be implemented as the sensor module 1161 of FIG. 9.

The sensor module 1161 may include at least one of the fingerprint sensor 1161-1, a photo sensor 1161-2, and the input sensor 1161-3. The fingerprint sensor 1161-1 may generate a data value corresponding to a fingerprint of the user. The fingerprint sensor 1161-1 may include any one of an optical type fingerprint sensor or a capacitive type fingerprint sensor.

The photo sensor 1161-2 (or an illuminance sensor) may sense external illuminance and provide an electrical signal or a data value corresponding to the sensed illuminance to the auxiliary processor 1112 (or the processor 1110). Additionally, the photo sensor 1161-2 may provide the photo sensing signal to the controller 1112-1 at a time point when the illuminance is sensed. The controller 1112-1 receiving the photo sensing signal may control the number of off periods included in the emission start signal. For example, when the photo sensing signal is supplied, the controller 1112-1 may control the emission start signal so that an off period of a small number of emission control signals is included in one frame period of the second driving frequency.

The input sensor 1161-3 may generate a data value corresponding to coordinate information of the input by the body of the user or the pen. The input sensor 1161-3 generates a capacitance change amount by the input as the data value. The input sensor 1161-3 may sense an input by the passive pen or may transmit/receive data to and from the active pen.

The input sensor 1161-3 may measure a biometric signal such as blood pressure, water, or body fat. For example, when the user touches a sensor layer or a sensing panel with a body part and does not move during a certain time, the input sensor 1161-3 may sense the biometric signal based on a change of an electric field by the body part and output information desired by the user to the display module 1140.

The sensor module 1161 may further include a digitizer. The digitizer may generate a data value corresponding to coordinate information input by a pen. The digitizer generates an electromagnetic change amount by an input as the data value. The digitizer may sense an input by a passive pen or transmit or receive data to or from the active pen.

At least one of the fingerprint sensor 1161-1, the photo sensor 1161-2, and the input sensor 1161-3 may be implemented as a sensor layer formed on the display panel 1141 through a successive process.

At least two of the fingerprint sensor 1161-1, the photo sensor 1161-2, and the input sensor 1161-3 may be formed to be integrated into one sensing panel through the same process. When at least two of the fingerprint sensor 1161-1, the photo sensor 1161-2, and the input sensor 1161-3 are integrated into one sensing panel, the sensing panel may be disposed between the display panel 1141 and a window disposed above the display panel 1141. According to an embodiment, the sensing panel may be disposed on the window, and a position of the sensing panel is not particularly limited.

At least one of the fingerprint sensor 1161-1, the photo sensor 1161-2, and the input sensor 1161-3 may be embedded in the display panel 1141. That is, at least one of the fingerprint sensor 1161-1, the photo sensor 1161-2, and the input sensor 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, or a humidity sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-3.

The sound output module 1163 is a device for outputting a sound signal to an outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed in the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-3 or output corresponding image data to the display module 1140. The processor 1110 may control a luminance of the display panel 1141 in response to the illuminance sensed by the photo sensor 1161-2. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication method.

The electronic device 1000 according to various embodiments disclosed in this document may be various types of devices. The electronic device 1000 may include, for example, at least one of a portable communication device (for example, a smart phone), a computer device, a portable multimedia device, a portable medical device, a camera, a wearable device, or a home appliance. The electronic device 1000 according to an embodiment of this document is not limited to the above-described devices.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A display device comprising:

a display panel including a pixel;

a voltage generator configured to generate a plurality of driving voltages for operating the pixel;

a memory including a plurality of lookup tables; and a driver configured to generate a data signal transmitted to the pixel, and to determine each of voltage levels of a power voltage, a first initialization voltage, a second initialization voltage, and a first low voltage among the plurality of driving voltages based on a luminance level of an image displayed by the display panel, wherein the voltage generator is configured to generate the determined power voltage, first initialization voltage, second initialization voltage, and first low voltage, and wherein the driver comprises:

a first voltage determiner configured to determine the voltage level of the power voltage based on a first lookup table among the plurality of lookup tables;

a second voltage determiner configured to determine the voltage level of the first initialization voltage based on a second lookup table among the plurality of lookup tables; and a third voltage determiner configured to determine the voltage level of the second initialization voltage based on a third lookup table among the plurality of lookup tables.

2. The display device according to claim 1, wherein the power voltage is supplied to a cathode electrode of a light emitting element included in the pixel, the first initialization voltage is a voltage for initializing a gate electrode of a driving transistor included in the pixel, the second initialization voltage is a voltage for initializing an anode electrode of the light emitting element, and the first low voltage is a voltage for turning on a P-type transistor included in the pixel.

3. The display device according to claim 1, wherein the driver further comprises a fourth voltage determiner configured to determine the voltage level of the first low voltage based on the voltage level of the power voltage, the voltage level of the first initialization voltage, and the voltage level of the second initialization voltage.

4. The display device according to claim 3, wherein the fourth voltage determiner is configured to determine the voltage level of the first low voltage based on following Formula 1:

$$VGL1 = \min(ELVSS, Vint1, Vint2) - \Delta V1, \quad \text{[Formula 1]}$$

where in the Formula 1, VGL1 is the first low voltage, ELVSS is the power voltage, Vint1 is the first initialization voltage, Vint2 is the second initialization voltage, and ΔV1 is a predetermined positive number.

5. The display device according to claim 4, wherein ΔV1 of the Formula 1 is a threshold voltage of the P-type transistor included in the pixel.

6. The display device according to claim 3, wherein the driver further comprises a fifth voltage determiner configured to determine a voltage level of a second low voltage for turning off an N-type transistor included in the pixel among the plurality of driving voltages, based on the voltage level of the first low voltage.

7. The display device according to claim 6, wherein the fifth voltage determiner is configured to determine the voltage level of the second low voltage based on following Formula 2:

$$VGL2 = VGL1 + \Delta V2, \quad \text{[Formula 2]}$$

where in the Formula 2, VGL2 is the second low voltage, and ΔV2 is a predetermined positive number.

8. The display device according to claim 7, wherein the fifth voltage determiner is configured to determine the ΔV2 of the Formula 2 based on the luminance level.

9. The display device according to claim 1, wherein the driver further comprises:

a fourth voltage determiner configured to determine the voltage level of the first low voltage based on a fourth lookup table among the plurality of lookup tables; and a fifth voltage determiner configured to determine a voltage level of a second low voltage for turning off an N-type transistor included in the pixel among the plurality of driving voltages based on a fifth lookup table among the plurality of lookup tables.

10. The display device according to claim 1, further comprising a temperature sensor configured to sense a temperature around the display panel, wherein the driver is configured to determine each of the voltage levels of the power voltage, the first initialization voltage, the second initialization voltage, and the first low voltage based on a temperature sensing value generated by the temperature sensor and the luminance level of the image displayed by the display panel, and the voltage generator is configured to generate the determined power voltage, first initialization voltage, second initialization voltage, and first low voltage.

11. The display device according to claim 1, further comprising:

an illuminance sensor configured to sense an illuminance around the display panel, wherein the driver is configured to determine the luminance level based on an illuminance sensing value generated by the illuminance sensor and image data input to the display device.

12. An electronic device comprising:

a display panel including a pixel;

a voltage generator configured to generate a plurality of driving voltages for operating the pixel;

a memory including a plurality of lookup tables; and a driver configured to generate a data signal transmitted to the pixel, and to determine each of voltage levels of a power voltage, a first initialization voltage, a second initialization voltage, and a first low voltage among the plurality of driving voltages based on a luminance level of an image displayed by the display panel, wherein the voltage generator is configured to generate the determined power voltage, first initialization voltage, second initialization voltage, and first low voltage, and wherein the driver comprises:

a first voltage determiner configured to determine the voltage level of the power voltage based on a first lookup table among the plurality of lookup tables;

a second voltage determiner configured to determine the voltage level of the first initialization voltage based on a second lookup table among the plurality of lookup tables; and a third voltage determiner configured to determine the voltage level of the second initialization voltage based on a third lookup table among the plurality of lookup tables.

13. A method of operating a display device, the method comprising:

determining each of voltage levels of a power voltage and an initialization voltage supplied to a pixel of the display device, based on a luminance level;

determining a voltage level of a first low voltage applied to a gate of a first type transistor included in the pixel, based on the determined voltage levels of the power voltage and the initialization voltage; and determining a voltage level of a second low voltage applied to a gate of a second type transistor included in the pixel, based on the voltage level of the first low voltage, and wherein:

determining each of voltage levels of the power voltage and the initialization voltage includes determining each of voltage levels of the power voltage, the first initialization voltage, and the second initialization voltage supplied to a pixel of the display device, based on first to third lookup tables;

determining the voltage level of the first low voltage includes determining the voltage level of the first low voltage applied to the gate of the first type transistor, based on a fourth lookup table; and determining the voltage level of the second low voltage includes determining the voltage level of the second low voltage applied to the gate of the second type transistor, based on a fifth lookup table.

14. The method according to claim 13, wherein the first type transistor is a P-type transistor, the second type transistor is an N-type transistor, the voltage level of the first low voltage is a voltage level for turning on the P-type transistor, and the voltage level of the second low voltage is a voltage level for turning off the N-type transistor.

15. The method according to claim 13, wherein the initialization voltage includes a first initialization voltage for initializing a gate electrode of a driving transistor included in the pixel and a second initialization voltage for initializing an anode electrode of a light emitting element included in the pixel, the power voltage is supplied to a cathode electrode of the light emitting element included in the pixel, and determining the voltage level of the first low voltage includes determining the voltage level of the first low voltage based on following Formula 1:

$$VGL1 = \min(ELVSS, Vint1, Vint2) - \Delta V1, \quad \text{[Formula 1]}$$

where in the Formula 1, VGL1 is the first low voltage, ELVSS is the power voltage, Vint1 is the first initialization voltage, Vint2 is the second initialization voltage, and ΔV1 is a predetermined positive number, wherein determining the voltage level of the second low voltage includes determining the voltage level of the second low voltage based on following Formula 2:

$$VGL2 = VGL1 + \Delta V2, \quad \text{[Formula 2]}$$

where in the Formula 2, VGL2 is the second low voltage, and ΔV2 is a predetermined positive number.

16. The method according to claim 13, wherein determining each of the voltage levels of the power voltage and the initialization voltage includes:

determining the voltage level of the power voltage based on a first lookup table, determining a voltage level of a first initialization voltage for initializing a gate electrode of a driving transistor included in the pixel among the initialization voltage based on a second lookup table, and determining a voltage level of a second initialization voltage for initializing an anode electrode of a light emitting element included in the pixel among the initialization voltage based on a third lookup table.

17. The method according to claim 13, further comprising:

generating the power voltage and the initialization voltage based on the determined voltage levels; and displaying an image on a display unit of the display device based on the generated power voltage and initialization voltage.

18. The method according to claim 13, wherein;

the first initialization voltage is a voltage for initializing a gate electrode of a driving transistor included in the pixel, the second initialization voltage is a voltage for initializing an anode electrode of a light emitting element included in the pixel, and the power voltage is supplied to a cathode electrode of the light emitting element included in the pixel; and the first type transistor is a P-type transistor, the second type transistor is an N-type transistor, the voltage level of the first low voltage is a voltage level for turning on the P-type transistor, and the voltage level of the second low voltage is a voltage level for turning off the N-type transistor.

* * * * *